Dec. 10, 1968  J. BELART ETAL  3,415,060

TANDEM BRAKE MASTER CYLINDER

Filed March 31, 1967 2 Sheets-Sheet 2

Juan Belart
Gert Schrader
INVENTORS.

BY

Karl F. Ross
Attorney

United States Patent Office 3,415,060
Patented Dec. 10, 1968

3,415,060
TANDEM BRAKE MASTER CYLINDER
Juan Belart and Gert Schrader, Walldorf, Germany, assignors to Alfred Teves Maschinen- und Armaturenfabrik KG., Frankfurt am Main, Germany, a corporation of Germany
Filed Mar. 31, 1967, Ser. No. 627,427
Claims priority, application Germany, July 22, 1966, T 31,657
10 Claims. (Cl. 60—54.6)

ABSTRACT OF THE DISCLOSURE

Tandem brake cylinder for a dual-network brake system in which a primary piston is rigidly connected with a secondary piston (the pistons forcing hydraulic fluid from respective chambers of a common cylinder to the respective braking cylinders), the secondary piston being surrounded by a sleeve with limited axial mobility and adapted to act upon the development of an overriding hydraulic pressure in one chamber to force hydraulic fluid in the other chamber to the respective wheel brake. The sleeve is biased against movement from a normal position in either axial direction by a spring.

---

Our present invention relates to a tandem brake cylinder for the simultaneous operation of at least two sets of wheel-brake cylinders in a dual-network braking arrangement and, more particularly, to a master cylinder capable of supplying the hydraulic networks of a dual-brake arrangement.

In the commonly assigned copending application Ser. No. 624,458 filed Mar. 20, 1967, entitled "Hydraulic Brake System With Locking Means" and filed by Ernst Meier and Hermann Seip, there is described, claimed and illustrated a number of dual-brake systems in which a tandem master cylinder displaces hydraulic fluid simultaneously to a pair of hydraulic networks with respective wheel-brake cylinders of an automotive vehicle, thereby increasing the safety factor of the brake system. In the arrangement there described and in earlier dual-brake systems involving the use of tandem master cylinders, a pair of hydraulic networks, each feed a plurality of wheel-brake cylinders. The configurations of such networks vary in accordance with the particular requirements of the system and it is not uncommon, therefore, for the rear wheel brake of the system to form one network while the front wheel brakes are joined in the other network. Greater safety and effectiveness is insured, however, when each network includes at least one front wheel brake and at least one rear wheel brake. In systems wherein each of the wheel brakes includes a pair of brakeshoes and respective wheel-brake cylinders adapted to operate each shoe, one set of wheel-brake cylinders (e.g. the inboard set) can form one hydraulic network while the other set (e.g. the outboard wheel-brake cylinders) form the other network. Tandem master cylinders in which a common bore is subdivided into at least two compartments or chambers, each having a respective piston, are used in such dual-brake arrangements, the hydraulic networks respectively communicating with these chambers ahead of the respective pistons.

The conventional tandem brake master cylinder is not entirely satisfactory because of difficulties inherent in the arrangement of the various parts. Thus, in one system, the primary and secondary piston are rigidly connected and jointly shifted by the brake pedal. When the primary and secondary networks are equally effective and the brakeshoes of these networks are worn to the same extent, such arrangements are entirely satisfactory. Generally, however, the brakeshoes of one set tend to wear at a faster rate than the brakeshoes of the other so that the fluid requirements of the former network exceed those of the latter networks for equal braking effectiveness. Under these conditions, the rigidly interconnected pistons tend to apply the brake of the hydraulic network with a lower requirement before the other brakes are applied; the result is an unevenness of braking and possible loss of vehicle control. The nonuniform braking just described also leads to increased wear upon certain of the brakeshoes, thereby increasing the likelihood of nonuniform braking in the future.

To obviate this difficulty, it has already been proposed to provide the secondary piston as a "floating" piston displaceable by hydraulic fluid in the first chamber and/or by a spring disposed between the positively displaced primary piston and the floating secondary piston. In this arrangement, a leak in one of the hydraulic networks increases the stroke of the piston until sufficient braking force is developed in the undamaged hydraulic network. In some cases, this increased pedal stroke permitted the operator of the vehicle to "floor" the brake pedal while even the undahaged hydraulic network remained inoperative. It will be recognized that, in such systems, effective breaking occurs only when the floating piston bears directly against the wall of the master cylinder or the primary piston abuts the secondary.

It is, therefore, the principal object of the present invention to provide, in a hydraulic brake system for automotive vehicles, an improved tandem master brake cylinder whereby the aforementioned disadvantages can be avoided.

A more specific object of this invention is to provide a tandem master cylinder or dual-network brake in which the stroke required for application of the brake is not materially increased even upon leakage in one of the networks.

These objects and others which will be apparent hereinafter are attained, in accordance with the present invention, by providing a master cylinder arrangement for automotive brake systems having two sets of brake energizable via separate hydraulic networks, which comprises a primary piston displaceable by the brake pedal in a first compartment of a single cylinder bore or chamber, a secondary piston head of the primary piston and rigidly connected therewith, and a "floating" plunger in the form of a sleeve surrounding the secondary piston and spring biased into a normal position but displaceable hydraulically against this bias in opposite axial directions. A first outlet port ahead of the primary piston communicates between the first compartment and one hydraulic network, while a second outlet port communicates between a second chamber in which the sleeve and the secondary chamber are disposed, and the other hydraulic network. Thus, the sleeve forms an independent piston which is displaceable by hydraulic-pressure preponderance in one of these chambers to increase the displacement of fluid through the port of the other and constitutes a movable wall of limited stroke for the first compartment.

When hydraulic pressure is generated in the first compartment upon depression of the brake pedal, hydraulic fluid is forced by the primary piston to one set of wheel cylinders through the corresponding hydraulic network. If there is no failure in either hydraulic network, the secondary piston also displaces its fluid through the second network to the other set of cylinders. When, however, the wheel brake cylinders of the first set evidence less brake-lining wear than those of the second set, the fluid pressure tends to build up rapidly in the primary chamber, since the corresponding wheel-brake pistons reach their limiting advanced positions prior to those of the second set. Thus, the hydraulic pressure within the primary chamber applies a pressure differential to the sleeve which advances the latter concurrently with the second piston (which is positively coupled with the primary piston) to increase the fluid displacement from the secondary chamber per unit stroke of the primary and secondary pistons. This increased hydraulic flow drives the pistons of the second set of brake cylinders at a faster rate than those of the first set and compensates for the greater wear of the brakeshoes of the second set.

Conversely, when the brakeshoes of the primary set suffer greater wear than those of the second set, the pressure buildup in the second chamber will occur at a rate greater than the rate of pressure increase in the primary chamber. When the spring bias of the sleeve is overcome by the pressure differential thereacross, the sleeve compresses the primary chamber and increases the rate of hydraulic-fluid flow therefrom to the brake cylinders of the first set.

According to a more specific feature of this invention, the stroke of the sleeve-like plunger or piston is limited by the cylinder so that, in the event of failure of either of the hydraulic networks, the sleeve will be immobilized in an extreme position corresponding to reduction of the volume of the corresponding chamber and the master-cylinder piston of the other chamber will remain fully effective to displace hydraulic fluid to its wheel-brake cylinder without significantly increased movement of the brake pedal or of the primary and secondary piston assembly of the master cylinder.

The above and other objects, features and advantages of the present invention will become more readily apparent from the following description, reference being made to the accompanying drawing in which.

Figure 3:
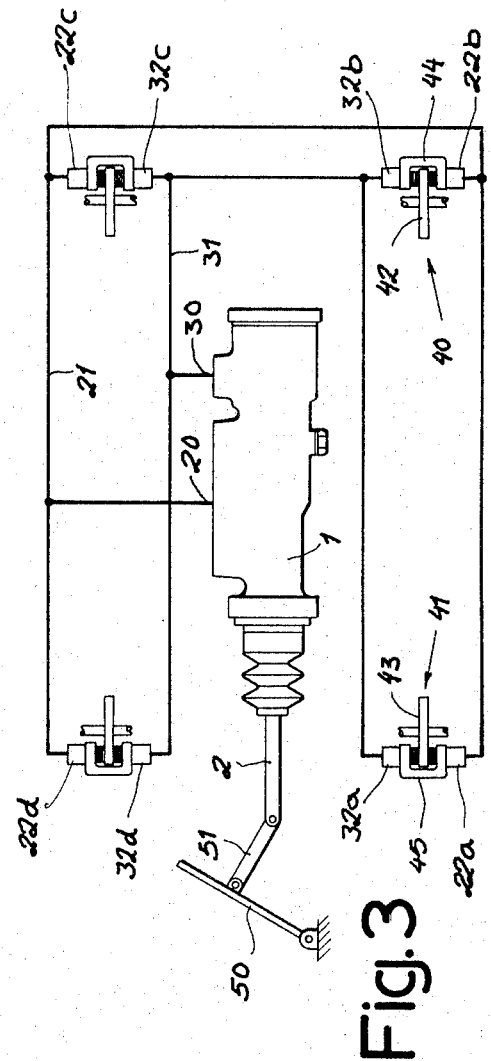
FIG. 3 is a view of a brake system embodying the master cylinder of the present invention.

Referring first to FIG. 3, it can be seen that an automotive vehicle brake system, according to our invention, comprises a master cylinder having a pair of outlet ports 20 and 30 respectively connected to hydraulic networks 21 and 31 of respective sets of wheel brake cylinders. While substantially any wheel-brake arrangement may be used in the system of this invention, the wheel brakes 40 and 41 of the front and rear wheels of the vehicle are represented as disk brakes with braking disks 42 and 43, respectively. The disks co-operate with brake yokes 44 and 45 each carrying an inboard wheel cylinder 32a, 32b, 32c and 32d supplied with hydraulic fluid by the network 31. The other network 21 supplies hydraulic fluid to the outboard wheel cylinders 22a, 22b, 22c and 22d of each yoke. The connecting rod 2 of the master cylinder 1 is coupled with the brake pedal 50 via a pivot arm 51 in the usual manner.

As can be seen from FIGS. 1 and 2, the master cylinder 1 is provided with an axially extending bore 52 subdivided into a pair of working compartments 7 and 8 referred to hereinafter as the first and second chambers and respectively receiving the primary piston 3 and the secondary piston 4 which are rigidly connected by a rod 5. The piston 3 is formed with a gland-type, flanged seal 3a engaging the wall of chamber 7 to prevent leakage of fluid past the piston, and receives the ball-shaped end 2a of the rod 2. The piston 3 is, moreover, retained in the chamber 7 by a locking ring 53. The rod 2 is provided with a boss 2b whose annular groove 2c receives the lip 54a of a sealing sleeve 54, the latter being vented to the atmosphere. The sleeve 54 prevents entry of dirt, oil and other contaminants into the brake and has a lip 54b engaging the cylinder housing 1. At its forward end, the piston 3 is provided with a check-valve arrangement including a plurality of angularly spaced axial bores 3b formed in the piston head of the usual annular space 3c and closed by a disk 3d upon advance of this piston. A brake cup in the form of a U-section seal 3e overlies the disk 3d and is retained in place by a ring 3f seated against a shoulder 5a of the rod 5.

Figure 1:
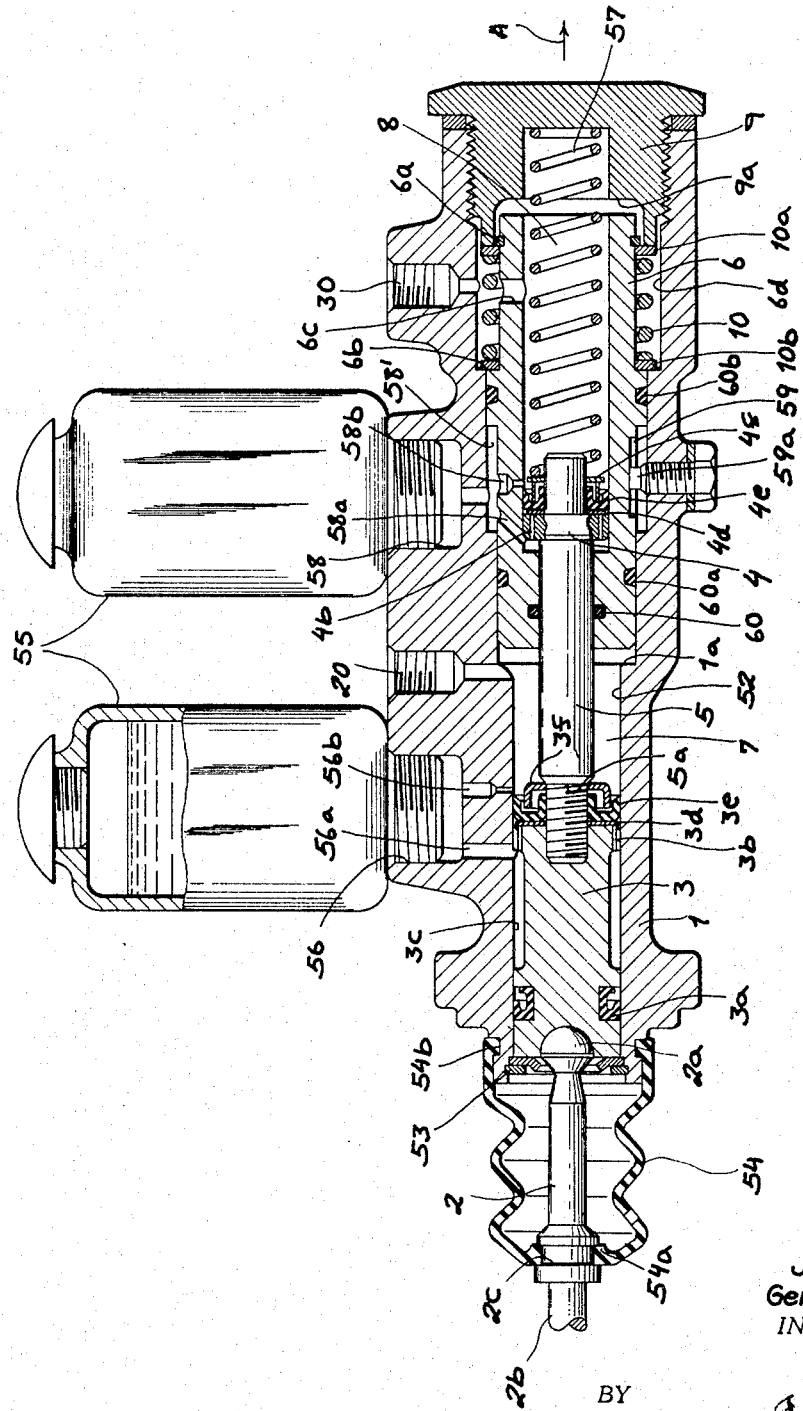
FIG. 1 is an axial cross-sectional view through a master cylinder, according to this invention.
Figure 2:
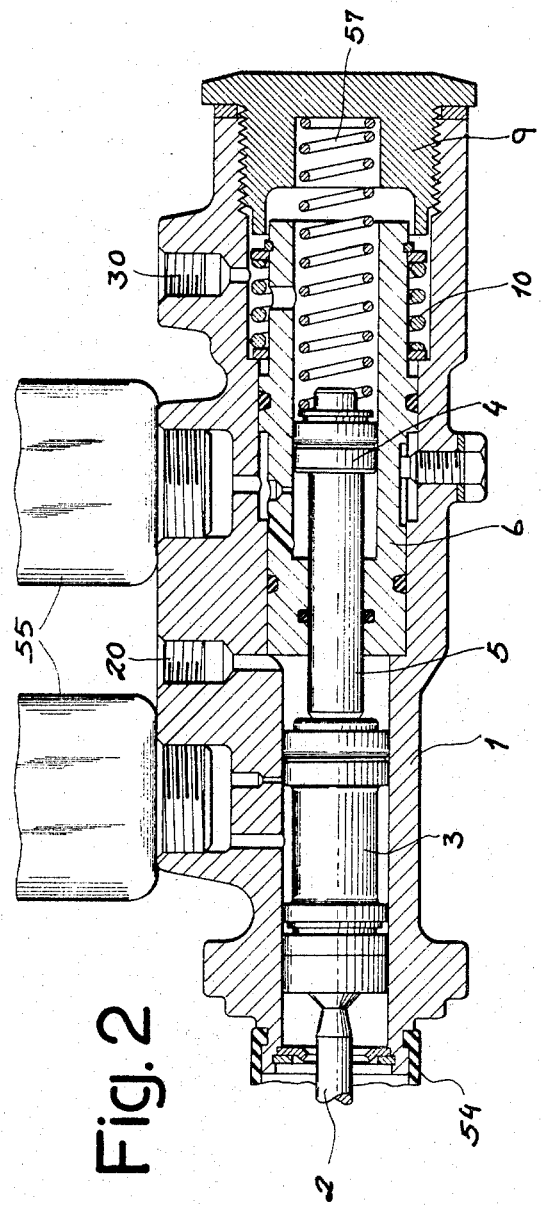
FIG. 2 is an axial cross-sectional view through a master cylinder illustrating the moving parts in a different position.

The brake-fluid supply tank 55, represented in dot-dash lines in FIG. 1, is of the divided type and communicates with a fitting 56 from which the brake fluid is delivered to the intake port 56a of the first chamber 7 and to the so-called "bypass" port 56b.

The secondary piston 4 which may be formed integrally on the rod 5 is likewise provided with a multiplicity of bores 4b co-operating with a check valve formed by the piston cup 4e which overlies a disk 4d. The cup 4e is held in place by a ring 4f against which the piston-return spring 57 is seated. The second chamber of the fluid-supply tank 55 communicates with a fitting 58 which, in turn, opens into a chamber 58' surrounding a sleeve 6. The chamber 58' delivers brake fluid to the inlet port 58a and the bypass port 58b of the secondary piston 4, these ports being provided directly in the sleeve 6 which is prevented from rotating about its axis by a key slot 59 into which the end 59a of a bolt 59b extends. The rod 5 passes through the closed end of sleeve 6 and is sealed against leakage via an O-ring 60. Further seals 60a and 60b surround the sleeve 6 and sealingly engage the wall of the cylinder bore 52. The sleeve 6 is open at its righthand extremity and can abut against a plug 9 threaded into the corresponding end of the cylinder housing 1 which also serves as a stop for a spring seat 10a which is slidable upon the sleeve 6. Thus, the sleeve 6 is provided with a split ring 6a adapted to retain the stop 10a which, together with a seating ring 10b on the sleeve 6, confines under precompression a coil spring 10. The seating ring 10b normally rests against a shoulder 6b of the sleeve 6 so that the spring 10 is captive and prestressed. The chamber 8 communicates, via a radial bore 6c in the sleeve 6 and a compartment 6d surrounding the sleeve and enclosing the spring 10, with the outlet port 30 of the second chamber and the second hydraulic network 31. Thus, the sleeve 6 forms a plunger in both chambers 7, 8 and is free to move within limits defined by the wall 9a of plug 9 and shoulder 1a of the housing in opposite directions against the force of spring 10. The bolt 59b can also form the stop, if required.

Then the brake pedal 50 is actuated under normal conditions, the pistons 3 and 4 are simultaneously advanced and hydraulic fluid is respectively displaced via port 20 and port 30 to the networks 21 and 31. When the brakes of the primary network 21 engage prior to those of the secondary network 31, full pressure develops in compartment 7 while hydraulic fluid flow continues without substantial increase in pressure from chamber 8. Under these conditions, a fluid pressure differential is applied to the sleeve 6 in the direction of arrow A and the volume of this compartment is thus reduced by the joint action of the piston 4 and this sleeve (FIG. 2) so that the hydraulic fluid flow from this chamber is augmented and braking pressure rapidly achieved.

In the converse case, e.g. when the brakeshoes of the secondary network 31 apply prior to those of network 21, the buildup of pressure in chamber 8 rapidly reaches its maximum or braking pressure while the pressure in chamber 7 remains low. In this case, the differential piston-effect drives the sleeve 6 to the left to increase the flow rate from chamber 7 and rapidly applies the brakes of the first set. Thus, under normal operating conditions the braking pressure is reached rapidly and substantially simultaneously in both chambers regardless of the brake wear. In effect, the piston of the master cylinder in the chamber whose wheel brakes are most worn is enlarged upon development of the unequal pressures across the sleeve 6.

Upon leakage in one network 21 or 31, the sleeve 6 shifts in the direction of the chamber of the leaking network until it comes to rest against the abutment 9a or the abutment 1a (FIG. 2), whereupon further actuation of the rigidly connected systems 3, 4 force hydraulic fluid into the operative network without elongation of the piston stroke. The brake forces are distributed uniformly throughout the system, except in the case of leakage and in that event, the nondefective system receives full pressure without any increase in the stroke of the brake pedal or its pistons. Furthermore, the equalization action of the sleeve 6 is terminated by the positive arresting of the sleeve 6 when one of the brake networks leaks.

We claim:

1. A tandem master cylinder arrangement for a dual-network hydraulic brake system comprising a cylinder housing having a cylinder bore; a primary piston and a secondary piston slidable jointly in said bore and forming therein ahead of each piston a respective working chamber communicating with a respective hydraulic network; and a sleeve surrounding one of said pistons and axially displaceable in opposite directions from a normal position in dependence upon the hydraulic pressure differential of said chambers to reduce the volume of the chamber of relatively low pressure upon the development of a hydraulic pressure differential in said chambers.

2. A tandem master cylinder arrangement as defined in claim 1, further comprising stop means engageable with said sleeve upon movement thereof in either axial direction.

3. A tandem master cylinder arrangement as defined in claim 2, further comprising spring means biasing said sleeve into said normal position and resisting movement of said sleeve under said pressure differential in either axial direction.

4. A tandem master cylinder arrangement as defined in claim 3 wherein said stop means is a respective abutment formed by said housing on either side of said sleeve in said bore.

5. A tandem master cylinder arrangement as defined in claim 3 wherein said spring means includes a spring mounted on said sleeve and a pair of spring seats axially shiftable on said sleeve and retaining said spring between them, said housing being formed with a pair of abutments respectively engageable with said spring seats upon the axial movement of said sleeve in a respective direction.

6. A tandem master cylinder arrangement as defined in claim 3 wherein said sleeve surrounds said secondary piston, said primary piston is connectable to a brake pedal of an automotive vehicle, and said secondary piston is disposed ahead of said primary piston and is connected thereto by a rod passing through said sleeve.

7. A tandem master cylinder arrangement as defined in claim 6 wherein said housing is provided with an outlet port communicating with the hydraulic network of said secondary piston, said sleeve being formed with a bore communicating between the working chamber of said secondary piston and said outlet port.

8. A tandem master cylinder arrangement as defined in claim 6 wherein said housing is provided with a hydraulic-fluid supply tank, said sleeve being formed with an inlet port communicating with said tank.

9. A tandem master cylinder arrangement as defined in claim 6, further comprising a spring in said housing bearing axially upon said piston.

10. A tandem master cylinder arrangement as defined in claim 6 wherein said sleeve sealingly engages the wall of said bore and said secondary piston sealingly engages said sleeve.

References Cited

UNITED STATES PATENTS 3,140,587   7/1964   Stelzer _____ 60—54.6
3,292,371   12/1966  Belart _____ 60—54.5

MARTIN P. SCHWADRON, *Primary Examiner.*

ROBERT R. BUNEVICH, *Assistant Examiner.*

U.S. Cl. X.R.

188—152